Patented June 14, 1938

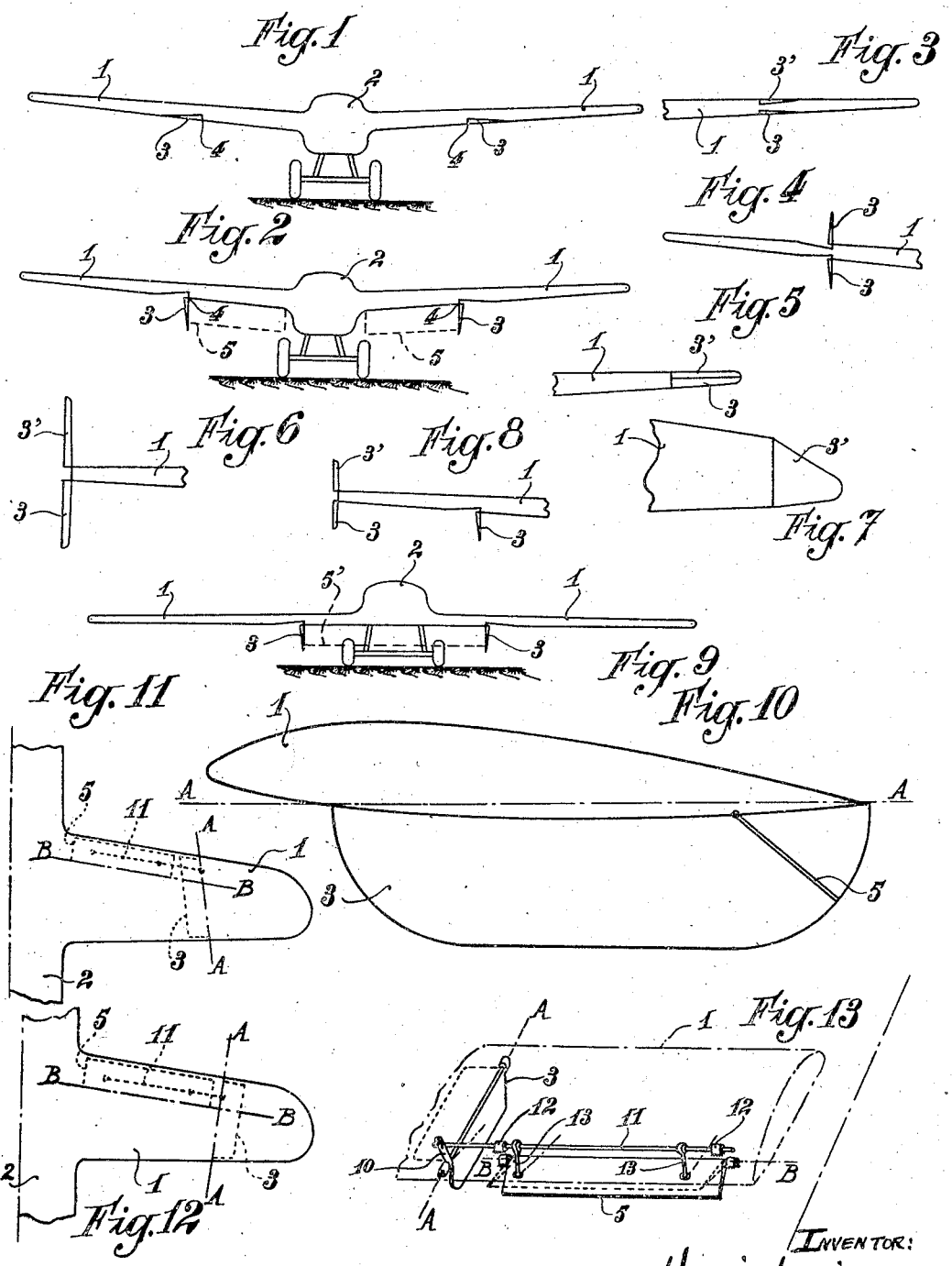

2,120,760

UNITED STATES PATENT OFFICE 2,120,760

SUPPORTING SURFACE OF AIRPLANES AND THE LIKE AIRCRAFT

Henri Lumiere, Lyon, France

Application November 12, 1935, Serial No. 49,407
In France January 19, 1935

11 Claims. (Cl. 244—91)

My invention relates to a system of movable flaps intended to increase the sustaining power of the supporting surface or surfaces of an airplane.

Many devices have been proposed for the above purpose, more particularly to facilitate landing, such as supersustainer flaps or sagging ailerons which are normally hidden under the wings of the airplane and can pivot about a horizontal axis perpendicular to the direction of travel of the aircraft in such a way that their incidence suddenly increases.

The flaps according to the present invention are different from the known supersustainer flaps with which however they can be used on the same machine. They are likewise articulated to the wings but the axis of articulation is so arranged that the flaps when open will be parallel to the direction of travel of the airplane and perpendicular to the surface of the wings.

The control of the flaps according to this invention may also be connected with the control of the supersustainer flaps or sagging ailerons in such a way that the tendency of the first-named flaps will help the operation of the supersustainer flaps or sagging ailerons and reduce the force required from the pilot.

In the annexed drawing:—

Fig. 1 is a diagrammatic front view of an airplane provided with flaps according to the invention shown in the folded position.

Fig. 2 is a similar view showing the flaps in the open position.

Figs. 3 and 4 are partial views showing a modification of construction.

Figs. 5 and 6 are partial views showing a second modification of construction wherein the flaps form the ends of the wings.

Fig. 7 is a plan view of Fig. 5.

Fig. 8 shows a combination of the arrangements shown in Fig. 2 and Fig. 6.

Fig. 9 is a similar view to Fig. 2, but illustrates the invention applied to an airplane with an elliptical supporting surface.

Fig. 10 is a diagrammatic section of a wing showing a flap according to the invention and a supersustainer flap, both in the open state.

Figs. 11 and 12 are diagrammatic plan views indicating two possible arrangements of the flaps; and Fig. 13 is a perspective view showing a possible embodiment of the combined control.

The airplane illustrated in Fig. 1 has two wings I integral with a fuselage 2. Towards the middle of the length of each wing I there is a flap 3 the axis of articulation 4 of which is parallel to the longitudinal axis of the airplane. The flaps, in the closed position, are countersunk into the thickness of the wings so that the underside of the latter will then be perfectly smooth.

In the open position the flaps 3 are parallel with the direction of movement of the airplane and perpendicular to the plane of the wing as shown in Fig. 2. They thus canalize the air between the fuselage 2 and themselves and consequently increase the support of the airplane.

This increase of sustentation is further increased if the wing is provided with supersustainer flaps 5 arranged between the fuselage and the flaps 3 of the present invention, as diagrammatically indicated in broken lines in Fig. 2. These supersustainer flaps 5 create a strong superpressure which causes a considerable lateral flow of air, the escape of which is almost radically cut off by the flaps 3. The effect of the supersustainer flaps 5 is thus increased.

As can be understood, the number and arrangement of the flaps 3 may vary according to requirements and they may be provided on the undersides of the wings or on the top sides or on both the top and undersides as shown in Figs. 3 and 4, for example, or in any other manner.

When two flaps 3 and 3' are arranged near the ends of the wings as shown in Figs. 3 and 4 it is advisable to arrange them so that they themselves constitute the wing-ends by being directly superimposed in the folded position, as shown in Figs. 5 to 7, so that in the open position an increase of the trail is obtained by the reduction of the wing span and by the increase of the resistance to the travel by the flaps, which, when open, as shown in Fig. 6, no longer form the regular outline which they formed when closed.

Moreover the flaps 3, 3' may be combined in any suitable arrangement. Fig. 8 shows by way of example a wing with flaps at the end forming the wing-tip and a further flap fitted in under the wing.

Fig. 9 shows an airplane having an elliptical wing. In this case, the single supersustainer flap 5' may extend from the one flap 3 to the other while passing under the fuselage 2.

The flaps 3 may extend over the whole depth of the wing or only partly.

The flaps according to the invention may also have their control gear combined with the gear controlling the supersustainer flaps or sagging ailerons. If the former flaps are appropriately arranged, the action of the air tends to open them as soon as they are not flush with the wing surface and this action reduces the force required to operate the supersustainer flaps or sagging ailerons.

In Fig. 10, the axis A—A of the hinged joint of flap 3 is inclined in a vertical plane with respect to the direction of the airplane in such a way that as soon as the flap is partly opened, it tends to open to its full extent. In Figs. 11 and 12 the axis A—A is oblique in a horizontal plane with respect to the direction of the airplane and the flap also tends to open by itself. With this arrangement the opened flap is not perfectly parallel to the direction of travel of the aircraft, but since the flaps on a wing and on the other are inclined symmetrically, the airplane is not moved laterally but only braked. Of course, according to the direction of the inclination of axis A—A, the folding of the flap must take place in one direction or in the other one. In the arrangement of Fig. 11 air escaping laterally from under the supersustainer flap 5 helps to open the flap 3. Axis B—B indicates the hinged joint of the supersustainer flap 5.

The inner face of the flap such as 3 could also be at an angle so as to give the required tendency towards opening.

The connection between the control gears of flaps 3 and 5 may be of any kind. In the example shown in Fig. 13, flap 3 rotates about axis A—A and it is operated by means of an arm 10 actuated by a rod 11 sliding through guides 12. The supersustainer flap 5 is articulated about B—B and it is operated by pusher rods 13 pivoted by means of ball and socket joints at both ends, said rods being actuated by rod 11. It will be grasped that by pulling rod 11 flaps 3 and 5 are closed (position shown in dotted lines). When rod 11 is pushed, the flaps open and the tendency of flap 3 towards self-opening helps the operation of the supersustainer flap 5.

Since it is possible to arrange a number of flaps such as 3 under or on a wing, it is possible to obtain a compensating force high enough to render the operation of the supersustainer flaps quite easy.

I claim:

1. An imperforate wing or supporting surface for airplanes or the like adapted to be disposed laterally of the fuselage thereof, including an articulated lift-increasing flap adjacent the fuselage which in open position is disposed at a substantial angle to the direction of travel of the airplane; a second articulated flap carried in the lower surface of the wing spaced inwardly from the tip thereof and closely adjacent the end of the first mentioned flap and having its axis of articulation disposed substantially parallel with the direction of travel of the airplane, said second flap when open being substantially perpendicular to the wing to canalize the air between itself and the fuselage and thereby increase sustentation, and means for opening and closing the said flaps.

2. In a wing or supporting surface as set forth in claim 1, said second-named flap being so arranged that it has a self-tendency to open under the action of the air currents.

3. In a wing or supporting surface as set forth in claim 1, said second-named flap being so arranged that it has a self-tendency to open under the action of the air; and means for operatively connecting said second-named flap with said first-named flap.

4. In an airplane having imperforate wings or supporting surfaces an articulated lift-increasing flap which in open position is disposed at a substantial angle to the direction of travel of the airplane; second articulated flaps carried in the lower surfaces of the wings spaced inwardly from the tip thereof and closely adjacent the ends of the first mentioned flap and having their axes of articulation disposed substantially parallel with the direction of travel of the airplane, said second flaps when open being substantially perpendicular to the wings to canalize the air between themselves and the first-named flap and thereby increase sustentation, and means for opening and closing the said flaps.

5. In an airplane as set forth in claim 4, said second-named flaps being so arranged that they have a self-tendency to open under the action of the air currents.

6. In an airplane as set forth in claim 4, said second-named flaps being so arranged that they have a self-tendency to open under the action of the air currents, and means for operatively connecting said second-named flaps with said first-named flap.

7. In an airplane having imperforate wings or supporting surfaces disposed laterally of the fuselage thereof, articulated lift-increasing flaps adjacent the fuselage which in open position are disposed at substantial angles to the direction of travel of the airplane; second articulated flaps carried in the lower surfaces of the wings spaced inwardly from the tip thereof and closely adjacent the outer ends of the first mentioned flaps and having their axes of articulation disposed substantially parallel with the direction of travel of the airplane, said second flaps when open being substantially perpendicular to the wings to canalize the air between themselves and the fuselage and thereby increase sustentation, and means for opening and closing the said flaps.

8. In an airplane as set forth in claim 7, said second-named flaps being so arranged that they have a self-tendency to open under the action of the air currents.

9. In an airplane as set forth in claim 7, said second-named flaps being so arranged that they have a self-tendency to open under the action of the air currents, and means for operatively connecting said second-named flaps with said first-named flaps.

10. In an airplane, a wing, wing tip shields mounted on the wing for pivotal movement laterally on the craft and adapted to assume fixed positions either substantially vertical to the wing for preventing wing tip vortices or substantially parallel thereto to form a part of the lifting surface and means whereby the wing tip shields may be operated at the will of the pilot, each of the shields being formed into two halves which in the vertical position extend upwardly and downwardly with respect to the wing tip.

11. In an airplane, a wing, wing tip shields mounted on the wing for pivotal movement laterally on the craft and adapted to assume fixed positions either substantially vertical to the wing for preventing wing tip vortices or substantially parallel thereto to form a part of the lifting surface and means whereby the wing tip shields may be operated at the will of the pilot, each of the shields being formed into two halves which in the vertical position extend upwardly and downwardly with respect to the wing tip, said halves when in the position parallel to the wing forming continuations of the upper and lower surfaces thereof.

HENRI LUMIERE.